Feb. 2, 1943. F. E. MUNSCHAUER 2,310,182
BACK GAUGE FOR SHEARS
Filed May 21, 1941 2 Sheets-Sheet 2
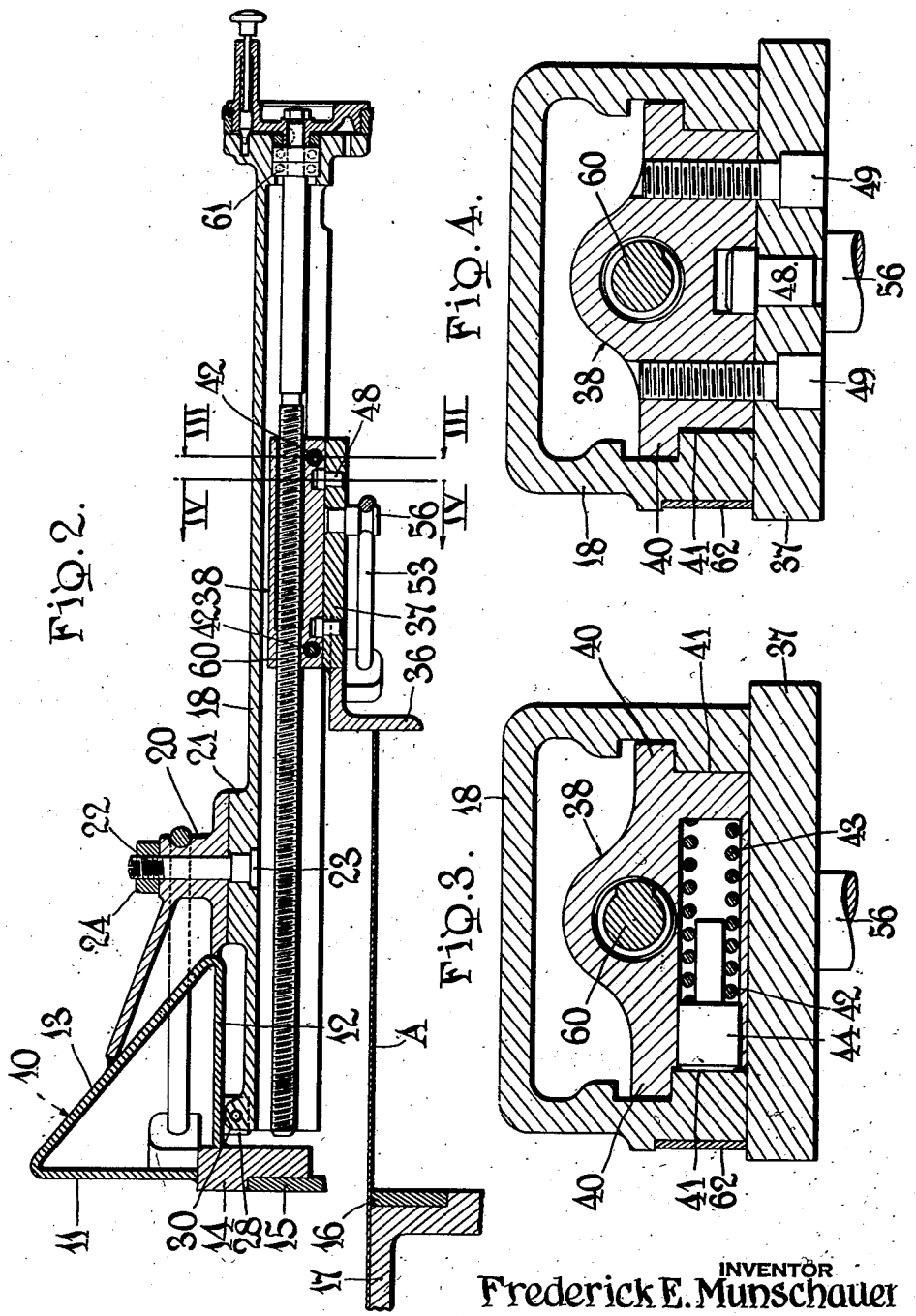
INVENTOR
Frederick E. Munschauer
BY
Beau Brooks Buckley & Beau.
ATTORNEYS Patented Feb. 2, 1943

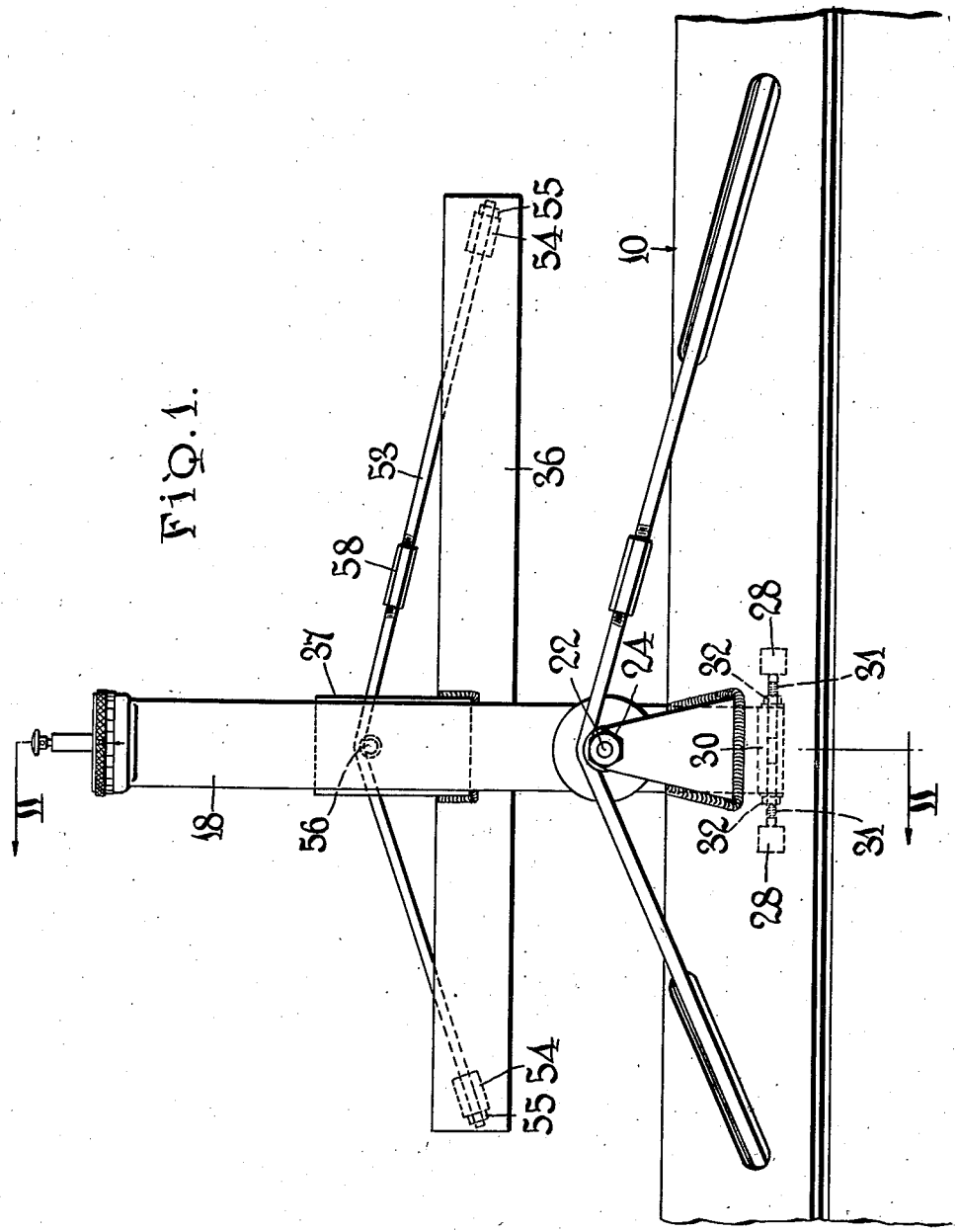

2,310,182

UNITED STATES PATENT OFFICE 2,310,182

BACK GAUGE FOR SHEARS

Frederick E. Munschauer, Buffalo, N. Y., assignor to Niagara Machine and Tool Works, Buffalo, N. Y.

Application May 21, 1941, Serial No. 394,513

10 Claims. (Cl. 164—59)

This invention relates to an improvement in machines of the class commonly known as squaring shears and involves particularly provision of novel gauge means for machines of this general class.

In conventional squaring shears, the machine is provided with a table for supporting a sheet or the like to be cut and one edge of the table serves as the lower of a pair of shear knives, a hardened steel insert usually being provided at such edge for performing the actual shearing. A shear of the general class here in contemplation is shown and described in my prior Patent No. 1,992,539 dated February 26, 1935, and reference may be had thereto as setting forth, by way of example, details not important to the principles of the present invention and accordingly not shown herein. In using machines of this type the piece to be cut is placed upon the table of the machine with the portion which is to be sheared or severed therefrom projecting over the aforesaid edge of the table. An upper movable shear knife is associated with the table in such manner that it may be forcibly brought down past the edge of the table over which the work extends and in close proximity to the edge of the table and the hardened steel insert, which is called the lower shear knife, to shear the sheet.

In general the movable shear knife is carried by a cross head which is supported at its opposite sides in suitable guide means associated with the machine frame in such manner that it may be reciprocated vertically to effect cutting strokes. In general such crossheads are arranged, so far as their transverse cross-section is concerned, to extend laterally away from the work table, whereby the crosshead may move downwardly freely without interference from the lower shear knife or the work table with which it is associated.

It is customary in these machines to form the cutting edge of the upper shear knife so that it extends at an angle to the horizontal, that is, to the direction of extent of the cutting edge of the lower shear knife, primarily for the purpose of distributing the work of shearing the sheet over a considerable portion of the downward stroke of the knife. This angularity of the shear knife is commonly referred to as "shear" and results in a cutting action wherein the piece being cut, usually a flat sheet or plate, is first severed at one of its lateral edges with the line of severance progressing across the sheet along the desired cutting line toward the other lateral edge as the downward movement of the shear knife continues.

In pursuing the principles of my invention I associate with a shear crosshead a back gauge having novel adjusting, supporting and positioning means. It may be noted here that, according to the construction of the present invention, the back gauge and all of its associated supporting positioning and adjusting instrumentalities are secured to and carried for reciprocation with the vertically reciprocating crosshead. As illustrated in the drawings my improved back gauge is suspended from a single arm or bracket extending rearwardly from a shear crosshead substantially medially of the length thereof. The back gauge is movably associated with the bracket whereby it may be adjusted lengthwise thereof to dispose the gauge bar at any desired distance from the shear knife, suitable adjusting and calibrating means being provided for this purpose.

In pursuing the principles of my invention I provide a back gauge construction wherein the back gauge bar is placed under predetermined flexural stress while at the same time means are provided for nicely adjusting, in a horizontal plane, its angularity with respect to the shear knife. The combination of these two means provides the possibility of adjusting the back gauge bar both as to lineality and angularity. That is to say, the bar may be adjusted so that its gauging surface extends in an absolutely straight line and such straight line gauging surface may be further adjusted to insure its exact parallelism with the line of shear as determined by the disposition of the shear knives.

The back gauge of the present invention further provides novel construction whereby the parts of the gauge mechanism which are readily movable, for changing the gauge position, are yieldingly held in accurately determined angular relation with respect to the relatively rigid structure for supporting the gauge proper.

Further advantages both from the standpoint of facility of manufacture and simplicity and efficiency of use will appear from a perusal of the following description of a specific embodiment of the principles of my invention taken together with the accompanying drawings.

In the drawings:

Fig. 1 is a fragmentary, plan view of so much of a squaring shear as is pertinent to an understanding of the improved construction of my invention;

Fig. 2 is a cross-sectional view taken on the line II—II of Fig. 1;

Fig. 3 is a cross-sectional view taken on the line III—III of Fig. 2; and

Fig. 4 is a cross-sectional view taken on the line IV—IV of Fig. 2.

In the drawings, like characters of reference denote like parts throughout the several figures and the numeral 10 designates generally a squaring shear crosshead which is conventional in construction excepting as indicated in the following description. In the illustrated form the crosshead is of the type built up of welded plates but the crosshead may be cast or otherwise fabricated without departing from the principles of the present invention. Such crossheads are conventionally provided at their opposite ends with suitable sliding and guiding surfaces for cooperation with vertical guideways provided at opposite sides of the structural frame of the squaring shear. An example of convenient vertical guide means and means for forcibly moving the crosshead up and down to effect shearing strokes will be found in my prior Patent No. 1,992,539, referred to hereinabove. Neither such frame elements nor the cooperating guiding surfaces need be depicted for proper understanding of the principles of the present invention and they are accordingly not shown in the drawings. As indicated in Fig. 2, the crosshead 10 is of substantially triangular transverse section, having a vertical wall 11, a horizontal bottom wall 12, and an oblique connecting wall 13 to provide a hollow structural cross-section.

Adjacent the intersection of the vertical wall 11 and the bottom wall 12, a longitudinally extending enlargement 14 receives and supports an upper shear knife 15. The upper shear knife 15 is arranged to reciprocate vertically with the crosshead 10 and so be moved downwardly past a lower stationary shear knife 16 which is rigidly associated with a work table 17, the latter being generally a part of the rigid stationary framework of the machine. A sheet of material A is shown on the work table 17 in Fig. 2 in position to be sheared.

For supporting the gauge bar of my invention I provide a bracket or arm 18 which is arranged to extend rearwardly (i. e. in a direction away from the shear knives) from the crosshead at a point medially thereof. The bracket 18 is substantially of channel cross-section transversely and is arranged with its web portion upwardly and its flanges extending downwardly. A bearing 20 having a substantially vertical axis is rigidly associated with the crosshead 10 and cooperates with a bearing 21 formed at the top of the bracket 18 to receive a common pivot pin 22 which may be arranged with a head portion 23 and a securing nut 24 at its opposite end. This pivotal connection of the bracket 18 with the crosshead 10 is provided for permitting angular adjustment of the bracket 18 and the gauge bar carried thereby with respect to the crosshead 10 and, more particularly, with respect to the shear knives 15 and 16 proper.

Adjusted pivotal position of the bracket 18 is secured and maintained by means of a pair of abutment blocks 28 which are rigidly secured to the underside of the crosshead 10 against the wall 12 thereof. The blocks 28 are spaced to receive therebetween the inner end of the bracket 18 and particularly a pair of lugs or bosses 30 which are preferably formed integrally with the bracket 18 at the upper side thereof and receive a pair of adjusting screws 31. The heads of the adjusting screws 31 are shown in Fig. 1 as being in engagement with the abutment blocks 28 and adjusted position is maintained by means of lock nuts 32.

When it it desired to adjust the angular disposition of the bracket 18 and the gauge bar carried thereby, the lock nuts 32 are loosened and angular adjustment is effected by screwing one of the screws 31 farther into its associated boss or ear 30 and unscrewing the other of the screws 31 until such unscrewing movement causes the heads of both screws 31 to come into locking engagement with the inner faces of the abutment blocks 28. It will be noted from the foregoing that once an adjusted position of the bracket 18 with respect to the crosshead 10 is attained, and secured by virtue of the screws 31 together with the lock nuts 32, the bracket 18 and the crosshead 10 are, in effect, a rigid integral unit.

The gauge bar itself is designated 36 in the drawings and is there shown as of angular transverse section with one of its flanges extending horizontally for engagement with supporting means and its other flange depending therefrom to provide an actual gauging surface. The gauge bar 36 is preferably disposed at an angle to the horizontal so that its upper surface assumes the same angle as the cutting edge of the upper movable shear knife 15. This angle is the angle of "shear" of the upper shear knife previously referred to.

By virtue of this angularity of the gauge bar its upper surface may be arranged to be disposed a very minute distance below the lower edge of the upper shear knife and in this way provision is made for moving the gauge bar toward the lower shear knife beneath the upper shear knife to permit gauging of extremely narrow strips. In fact, the gauge bar is capable of gauging strips as narrow as the shear itself is inherently capable of cutting. Of course, this ability to gauge extremely narrow strips is partly attributable to the suspension of the gauge bar from the vertically reciprocable crosshead 10 for movement therewith.

The gauge bar 36 is rigidly secured, as by welding or the like, to a plate element 37 which in turn is rigidly secured to a carriage which is designated generally 38. The carriage 38 is arranged so that it may be adjusted toward and away from the shear knives of the machine to adjust the position of the gauge bar 36 with respect to its distance from the line of shearing.

The carriage 38 has a pair of laterally extending flanges 40 and these, in cooperation with the lateral edges of the plate 37, form grooves which receive portions of the lower inside surface of the bracket 18 which are formed to provide tongues 41. In this manner the carriage 38 is arranged for guided movement lengthwise of the bracket 18.

To insure extremely accurate guided movement of the carriage 38 it is provided with several openings 42 which open into one of the lateral grooves formed by a flange 40 and the plate 37. Compression coil springs 43 are disposed in the openings 42 and act upon plugs 44 in the outer ends of the openings 42 to urge such plugs against one of the tongues 41 of the bracket 18. In this way the carriage 38 proper is always urged intimately against the opposite tongue 41 of the bracket 18 for accurately guided movement therealong, and thus maintenance of accurate parallelism between the gauge bar and the shear knife is attained and insured.

The illustrated construction of the carriage 38 and the associated plate member 37 has the virtue of facilitating the initial fitting of the bracket, the carriage, and the plate member 37 during construction of the machine to produce an accurate, true and close fit and facilitates consequent refitting when refitting is required. If engagement of the tongues 41 between the flanges 40 of the carriage 38 and the plate 37 should, after extended use, have too much vertical clearance, the plate 37 may merely be removed and the bottom surface of the carriage 38 may be ground or otherwise machined to remove the undesirable play or clearance.

In the drawings the numeral 48 indicates several dowels which are provided for accurately locating the plate 37 horizontally with respect to the carriage 38 and the plate 37 is secured to the carriage 38 by means of screws 49.

As appears best from Figs. 1 and 2, means are provided for imparting a predetermined horizontal flexure to the gauge bar 36 whereby the latter may subsequently be adjusted as to lineality by merely increasing or decreasing such flexure. In the illustrated instance, such flexure producing means comprises a tension rod 53 whose opposite ends are securely anchored to the gauge bar 36 adjacent its opposite ends as by passing through lugs 54 rigidly secured to the underside of the horizontal flange of the gauge bar 36, with suitable nuts 55 threaded to the ends of the tension rod 53 outside of the lugs 54. The tension rod 53 passes about an abutment pin 56 which is securely fitted into the plate 37 and flexure may be imparted to the gauge bar 36 or released therefrom by manipulation of a turnbuckle 58 which is interposed in the tension rod 53. If desired, the turnbuckle 58 may be dispensed with and tension of the rod 53 adjusted by means of the nuts 55.

For accurately disposing the gauge bar 36 with respect to the shear knives, movement of the carriage 38, in its guided relation with respect to the bracket 18, is accomplished by means of an adjustment screw 60 which passes through a suitably threaded opening extending lengthwise of the carriage 38. The screw 60 has bearing in the outer end of the bracket 18 as at 61. Such bearing and the instrumentalities appearing at the right-hand end of the bracket 18 as viewed in Fig. 1, for controlling and calibrating the adjustment of the carriage bar 36 by manipulation of the screw 60, are well known in the art to which the present invention appertains and will not be described herein. A scale is secured along the outside of the bracket 18 as at 62, such scale being graduated for cooperation with indicating means associated with the control means for the screw 60.

While a single specific application of the principles of my invention has been illustrated in the drawings and described in detail in the foregoing, it is to be understood that my invention is not to be considered as limited thereto or otherwise than as defined in the appended claims.

What is claimed is:

1. In a shearing machine, an elongate vertically reciprocable crosshead having a shear knife associated with a lower longitudinal edge thereof, gauge means comprising an elongate bracket having an end thereof secured to said crosshead substantially medially thereof and extending in a direction horizontally away from said shear knife, and means attaching said bracket to said crosshead, said means providing angular adjustment of the bracket with respect to the crosshead, and a substantially horizontally disposed gauge bar supported medially by said bracket for adjustable movement therealong.

2. In a shearing machine, an elongate vertically reciprocable crosshead having a shear knife associated with a lower longitudinal edge thereof, gauge means comprising an elongate bracket having an end thereof extending beneath said crosshead and extending in a direction horizontally away from said shear knife, and means attaching said bracket to said crosshead, said means providing angular adjustment of the bracket with respect to the crosshead, and a gauge bar supported medially by said bracket for adjustable movement therealong.

3. In a shearing machine, an elongate vertically reciprocable crosshead having a shear knife associated with a lower longitudinal edge thereof, gauge means comprising an elongate bracket having an end thereof disposed beneath said crosshead and extending in a direction horizontally away from said shear knife, said bracket being pivotally secured to said crosshead intermediate the ends thereof, means locking said bracket in adjusted pivotal position, and a substantially horizontally disposed gauge bar supported medially by said bracket for adjustable movement therealong.

4. In a shearing machine, an elongate vertically reciprocable crosshead having a shear knife associated with a lower longitudinal edge thereof, gauge means comprising an elongate bracket having an end thereof disposed beneath said crosshead and extending in a direction horizontally away from said shear knife, said bracket being pivotally secured to said crosshead intermediate the ends thereof, abutment means projecting downward from the lower side of the crosshead intermediate its longitudinal edges and other abutment means projecting from an adjacent part of said bracket, one of said means being adjustable, said abutment means cooperating to retain said bracket in angularly adjusted position on its pivotal support, and a gauge bar supported medially by said bracket for adjustable movement therealong.

5. In a shearing machine, a stationary horizontally extending shear knife, an elongate vertically reciprocable crosshead having a shear knife associated with a lower longitudinal edge thereof, said second shear knife being inclined to progressively shear a work piece in cooperation with said stationary shear knife, gauge means comprising an elongate bracket having an end thereof disposed beneath said crosshead and extending in a direction horizontally away from said shear knife, said bracket being pivotally secured to said crosshead intermediate the ends thereof and adjacent the longitudinal edge thereof opposite to the edge carrying the shear knife, abutment means projecting downward from the lower side of the crosshead and other abutment means projecting from the adjacent end of said bracket, one of said means being adjustable, said abutment means cooperating to retain said bracket in angularly adjusted position on its pivotal support, and a substantially horizontally disposed gauge bar supported medially by said bracket for adjustable movement therealong.

6. In a shearing machine, a stationary horizontally extending shear knife, an elongate vertically reciprocable crosshead having a shear knife associated with a lower longitudinal edge thereof, said second shear knife being inclined to progressively shear a work piece in cooperation with said stationary shear knife, gauge means comprising an elongate bracket having an end thereof disposed beneath said crosshead and extending in a direction horizontally away from said shear knife, said bracket being pivotally secured to said crosshead intermediate the ends thereof and adjacent the longitudinal edge thereof opposite to the edge carrying the shear knife, abutment means projecting downward from the lower side of the crosshead and other abutment means projecting from the adjacent end of said bracket, one of said means being adjustable, said abutment means cooperating to retain said bracket in angularly adjusted position on its pivotal support, and a gauge bar supported medially by said bracket for adjustable movement therealong, the upper surface of said gauge bar being disposed in a plane directly below the lower edge of said second shear knife whereby to be movable thereunder substantially up to said stationary shear knife.

7. In a shearing machine, an elongate vertically reciprocable crosshead having a shear knife associated with a lower longitudinal edge thereof, gauge means comprising an elongate bracket having an end thereof disposed beneath said crosshead and extending in a direction horizontally away from said shear knife, said bracket being pivotally secured to said crosshead intermediate the ends thereof, means on said bracket and said crosshead cooperating to retain said bracket in angularly adjusted position on its pivotal support, said bracket being in the form of an inverted channel, a carriage guided in said channel for longitudinal movement therein, and a gauge bar disposed below said bracket and supported medially by said carriage for adjustable movement therewith, said gauge bar having a gauging wall disposed closer to the shear knife than said carriage and adapted thereby to be moved to a position directly beneath said shear knife.

8. In a shearing machine, an elongate vertically reciprocable crosshead having a shear knife associated with a lower longitudinal edge thereof, gauge means comprising an elongate bracket having an end thereof disposed beneath said crosshead and extending in a direction horizontally away from said shear knife, said bracket being in the form of an inverted channel and pivotally secured to said crosshead intermediate the ends thereof, means on said bracket and said crosshead cooperating to retain said bracket in angularly adjusted position on its pivotal support, a gauge bar extending transversely below said bracket, and a carriage element for supporting the same for adjustable movement along said bracket, said carriage being disposed within said bracket and guided thereby for longitudinal movement therein.

9. In a shearing machine, a reciprocable crosshead having a shear knife and gauge means, said gauge means comprising an elongate bracket secured to said crosshead and extending horizontally therefrom, said bracket being in the form of an inverted channel, the flanges of said channel having inwardly directed longitudinal flanges at their lower terminal edges, a gauge bar element and a carriage element for supporting the same for movement lengthwise of said bracket, said carriage element comprising means within said channel having horizontal ledges disposed upon said inwardly directed flanges, said gauge bar element having a face for seating against the lower faces of said channel, and means on one of said elements projecting between said inwardly directed flanges for abutment with the other of said elements for detachable securement thereto, and resilient means associated with said projecting means and acting against the inner face of one of said flanges to urge said projecting means into intimate engagement with the inner face of the other of said flanges.

10. In a shearing machine, a reciprocable crosshead having a shear knife and gauge means, said gauge means comprising an elongate bracket secured to said crosshead and extending horizontally therefrom, said bracket being in the form of an inverted channel, the flanges of said channel having inwardly directed longitudinal flanges at their lower terminal edges, a gauge bar element and a carriage element for supporting the same for movement lengthwise of said bracket, said carriage element comprising means within said channel having horizontal ledges disposed upon said inwardly directed flanges, said gauge bar element having an upper face for seating against the lower faces of said channel, and means on said carriage element projecting downwardly between said inwardly directed flanges for abutment with the upper face of said gauge bar element for detachable securement thereto, and resilient means associated with said projecting means and acting against the inner face of one of said flanges to urge said projecting means into intimate engagement with the inner face of the other of said flanges.

FREDERICK E. MUNSCHAUER.